United States Patent Office 3,546,191
Patented Dec. 8, 1970

3,546,191
SOLID POLYPERFLUOROSTYRENE AND METHOD OF PREPARATION
Leo A. Wall, Colonial Beach, Va., and Daniel W. Brown, Bethesda, and Joseph M. Antonucci, Silver Spring, Md., assignors to the United States of America as represented by the Secretary of the Navy
No Drawing. Filed June 29, 1967, Ser. No. 650,133
Int. Cl. C08f 3/32
U.S. Cl. 260—91.5                2 Claims

ABSTRACT OF THE DISCLOSURE

Solid polymers of perfluorostyrene are formed by subjecting the monomer in the absence of oxygen to heat at temperatures in the range of from about 25 to 200° C. and pressures of from about 10,000 to 25,000 atmospheres. The polymerization may be conducted with the application of hard radiation, such as gamma rays.

---

The invention described herein may be manufactured and used by or for the Government of the United States of America for governmental purposes without the payment of any royalties thereon or therefor.

BACKGROUND OF THE INVENTION

The invention relates to polymers of perfluorostyrene and to a method for their production.

Solid polymers of perfluorostyrene have not been heretofore known. Attempts to polymerize the monomer by strictly thermal techniques failed to yield a polymer of significant molecular weight. The monomer when subjected in a sealed capsule and in the absence of oxygen to heat at 100° C. over a period of two years yielded a liquid product which was mainly two dimers. Polymerization by ultraviolet radiation also failed to yield a solid polymer. Again, only dimeric products were detected.

SUMMARY OF THE INVENTION

It is an object of the present invention to provide solid polymers of perfluorostyrene. It is another object to provide solid polymers of perfluorostyrene which are useful as structural materials. It is also an object to provide a method of producing solid polymers of perfluorostyrene.

The above and other objects are accomplished in the practice of the method of the invention in which the monomer, perfluorostyrene, is subjected in the absence of oxygen to heat at temperatures in the range of about 25 to 200° C. and pressures in the range of from about 10,000 to 25,000 atmospheres for a time sufficient to form a solid polymer. The polymerization may be conducted with the application or not of hard radiation such as gamma rays. The length of time for which the polymerization is conducted will generally determine the amount of solid polymer which is formed. The molecular weight of the solid polymers will depend generally on the particular temperature and pressure applied.

DESCRIPTION OF THE PREFERRED EMBODIMENT

Solid polymers of perfluorostyrene formed by the polymerization method of the invention may range in molecular weight from about 4000 to 5000 up to 25,000 and higher. They are oxidation-resistant and radiation-resistant materials. Dissolved in hexafluorobenzene they are useful as film-formers for providing oxidation-resistant coatings on metal surfaces. Those of the solid polymers which are of the higher molecular weight, for example, of about 20,000 to 25,000 average molecular weight, may be extrusion molded to form useful shapes and articles.

The polymerization may be carried out with the use of known apparatus for high pressure polymerizations which has been described by Wall, Brown and Florin in American Chemical Society Polymer Preprints, Chicago (1961), page 366. The bomb for holding the monomer is a simple cylinder in which the pressure is applied by means of a piston pushed by a hydraulic ram. The cylinder may be made of heat treated, stress-hardened, high temperature alloy steel. A threaded cap follows the piston and engages exterior threading on the cylinder to hold the piston in the cylinder for removal of the cylinder from the hydraulic press without loss of the applied pressure. The cylinder is provided with fittings for connection to a vacuum pump and introduction of the liquid monomer. The fittings include a sealing plug which is mounted on a shaft which extends through an O-ring seal. The cylinder is arranged in the vertical position with the vacuum head mounted on the open end of the cylinder and the sealing plug withdrawn into the vacuum head. When the cylinder has been exhausted, the vacuum line is closed and the degassed perfluorostyrene, under vacuum, is introduced into the evacuated cylinder chamber. The sealing plug is then pushed down into the cylinder chamber, the fittings disconnected, and the piston inserted in the cylinder for application of the pressure on the monomer. The cylinder is pumped down to a very low pressure, about 0.1 micron or less, to exhaust the air (oxygen) therefrom prior to introduction of the monomer.

Preferably, the cylinder bomb containing the monomer charge is first heated to temperature and the pressure then applied, although the heating and application of pressure may be conducted together. Heating of the bomb and monomer may be effected by means of electrical heating tape placed around the cylinder.

The invention is illustrated by the following specific examples in which the monomeric perfluorostyrene, degassed and under vacuum, was poured into the previously exhausted cylinder chamber to provide a charge therein of approximately 6 to 10 grams. The cylinder had a one-half inch diameter chamber and was made of a heat-treated, stress-hardened, high temperature alloy steel.

EXAMPLE 1

The monomer was subjected to a pressure of 11,500 atmospheres at 155° C. for 19.7 hours while being irradiated with gamma rays from a Cobalt-60 source at a dose rate of 0.045 Mrad./hour. The conversion of the monomer to the polymer was approximately 50 to 60%. The product polymer, polyoctafluorostyrene, was a white, glassy solid of high softening point.

The product polymer, unlike poly-2,3,4,5,6-penta fluorostyrene, was not soluble in acetone or methyl ethyl ketone but was only swelled by these solvents.. It was, however, soluble in hexafluorobenzene and has an intrinsic viscosity therein of 0.12 (decaliters per gram) at 29.8 C. The average molecular weight of the product polymer as determined by vapor pressure osmometry was 25,000.

The product polymer was cut into 10 fractions by the use of petroleum ether as the precipitant and hexafluorobenzene as the solvent. The softening points of several fractions, determined with the use of a Fisher melting point block, are shown below.

| Fraction: | Softening Point, ° C. |
|---|---|
| 1 ($\eta$) — 0.22 | 255 |
| 2 | 255 |
| 4 | 252 |
| 6 | 242 |

EXAMPLE 2

The monomer was subjected to a pressure of 20,000 atmospheres at 155° C. for 15 minutes. The conversion of the monomer to the solid polymer was 35.6%. The polymer product had an intrinsic viscosity in hexafluorobenzene of 0.18 (deciliters per gram) at 29.8° C.

EXAMPLE 3

The monomer was subjected to 15,000 atmospheres at 97° C. for 4⅓ hours. The conversion of the monomer to the solid polymer was 7.5%. The product polymer had an intrinsic viscosity in hexafluorobenzene of 0.37 (deciliters per gram) at 29.8° C.

While the invention has been described herein with reference to certain specific embodiments thereof, it is intended that these shall be taken by way of illustration and not in limitation except as may be defined in the appended claims.

What is claimed and desired to be secured by Letters Patent of the United States is:

1. Solid polymerized perfluorostyrene.
2. Solid polymerized perfluorostyrene having a molecular weight of from about 4000 to 25,000.

References Cited

UNITED STATES PATENTS

| | | | |
|---|---|---|---|
| 2,689,241 | 9/1954 | Dittman et al. | 260—87.5 |
| 2,774,751 | 12/1956 | Passino et al. | 260—87.5 |
| 2,820,026 | 1/1958 | Passino et al. | 260—92.1 |
| 2,837,505 | 6/1958 | Dittman et al. | 260—92.1 |
| 3,187,058 | 6/1965 | Patrick et al. | 260—651 |
| 3,265,746 | 8/1966 | Wall et al. | 260—651 |
| 3,380,983 | 4/1968 | Siegart et al. | 260—93.5 |

OTHER REFERENCES

ACS Polymer Preprints, Chicago (1961) pp. 366–371.
ACS Polymer Preprints, New York (1966) pp. 1071-82 and 1112-15.

HARRY WONG, JR., Primary Examiner

U.S. Cl. X.R.

117—132; 204—159.22; 260—33.8